United States Patent
Kobayashi et al.

(10) Patent No.: US 9,500,234 B2
(45) Date of Patent: Nov. 22, 2016

(54) FASTENING FRICTION PLATE, AND FASTENING AND FIXING STRUCTURE FOR STRAIN WAVE GEARING AND OUTPUT MEMBER

(71) Applicant: Harmonic Drive Systems Inc., Shinagawa-ku (JP)

(72) Inventors: Masaru Kobayashi, Azumino (JP); Tatsuro Hoshina, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 351 days.

(21) Appl. No.: 14/375,377

(22) PCT Filed: May 8, 2013

(86) PCT No.: PCT/JP2013/002965
§ 371 (c)(1),
(2) Date: Jul. 29, 2014

(87) PCT Pub. No.: WO2014/181373
PCT Pub. Date: Nov. 13, 2014

(65) Prior Publication Data
US 2016/0025145 A1    Jan. 28, 2016

(51) Int. Cl.
 F16D 1/076    (2006.01)
 F16D 1/033    (2006.01)
 F16D 69/00    (2006.01)
 F16H 49/00    (2006.01)
 F16B 39/24    (2006.01)
 F16D 69/02    (2006.01)

(52) U.S. Cl.
CPC ............... *F16D 1/076* (2013.01); *F16B 39/24* (2013.01); *F16D 1/033* (2013.01); *F16D 69/00* (2013.01);

(Continued)

(58) Field of Classification Search
CPC .. F16D 69/00; F16D 2069/004; F16B 2/005; F16H 49/001
See application file for complete search history.

(56) References Cited

U.S. PATENT DOCUMENTS 2,779,175 A * 1/1957 Le Hew ................. F16D 7/025
                                                    192/113.36
2,879,092 A * 3/1959 Hargrove et al. ....... E21B 10/60
                                                       403/337

(Continued)

FOREIGN PATENT DOCUMENTS

JP    50-89741 A    7/1975
JP    63-86454 U    6/1988

(Continued)

OTHER PUBLICATIONS

International Search Report (PCT/ISA/210) mailed on Jun. 25, 2013 by the Japanese Patent Office as the International Searching Authority for International Application No. PCT/JP2013/002965.

Primary Examiner — Michael P Ferguson
(74) Attorney, Agent, or Firm — Buchanan Ingersoll & Rooney PC

(57) ABSTRACT

A fastening friction plate is wedged between the fastening surfaces of two fastening members in order to increase the fastening force between them. The fastening friction plate has a friction plate main body of a fixed thickness, and engaging protuberances having an approximately truncated cone shape formed on the both surfaces of the friction plate main body at a fixed pitch. The friction plate main body and the engaging protuberances are integrally formed by photo-etching into the both surfaces of a steel plate material having a fixed thickness. The hardness of the fastening friction plate is equal to or greater than that of the fastening surfaces of the fastening members.

2 Claims, 10 Drawing Sheets

(52) U.S. Cl.
CPC ............ *F16D 69/02* (2013.01); *F16H 49/001* (2013.01); *F16D 69/023* (2013.01); *F16D 2069/004* (2013.01); *F16D 2300/10* (2013.01)

(56) References Cited

U.S. PATENT DOCUMENTS 9,212,703 B2 * 12/2015 Mordukhovich et al. ............... F16D 13/64
9,394,985 B2 * 7/2016 Kobayashi et al. .. F16H 49/001
2010/0212446 A1 8/2010 Zhang

FOREIGN PATENT DOCUMENTS

| JP | 03-88884 | 9/1991 |
|----|----------|--------|
| JP | 07-083211 A | 3/1995 |
| JP | 10-059192 A | 3/1998 |
| JP | 2000-055095 A | 2/2000 |
| JP | 2010-190373 A | 9/2010 |

* cited by examiner (a)

(c)

(b)

(a)

(c)

(b)

(a)

(b)

DIG-IN DEPTH x ≈ d
DIG-IN PROJECTED SURFACE AREA AT ≈ At
INDENTATION SURFACE AREA AR ≈ Ar
AT/AR = APPROXIMATE COEFFICIENT OF FRICTION M ≈ Max 0.43

FASTENING FRICTION PLATE, AND FASTENING AND FIXING STRUCTURE FOR STRAIN WAVE GEARING AND OUTPUT MEMBER

TECHNICAL FIELD

The present invention relates to a fastening friction plate for use in fixedly fastening a member for torque transmission, and a fastening and fixing structure for a strain wave gearing and an output member utilizing the fastening friction plate.

BACKGROUND ART

One known example of a structure of fixedly fastening two members for transmitting torque is a structure in which a friction plate is wedged between the fastened surfaces of the two members being fastened, and the two members are fixed in a fastened manner by a bolt or the like. Patent Document 1 provides a friction sheet used in such a fastening and fixing structure. In this friction sheet, the surface of a metal elastic sheet is plated with diamond grains that can dig into the fastening surfaces of the fastening-target member.

For example, when a friction sheet is wedged between the fastening end surfaces of two shaft members and the fastening end surfaces are fixed in a fastened manner by a fastening bolt, the diamond grains on both sides of the friction sheet dig into the fastening end surfaces of both members and a large frictional force is produced between these fastening end surfaces. The fastening force of the two shaft members thereby increases, and a large torque can be transmitted.

PRIOR ART DOCUMENT

Patent Document

[Patent Document 1] JP 3547645

DISCLOSURE OF THE INVENTION

Problems to be Solved by the Invention

In a fastening and fixing structure that uses a friction sheet, diamond powder retained by the plating layer may fall off. When the diamond grains that have fallen off scatter and infiltrate places such as the rotational sliding portions of the shafts to be fastened, these portions may be subjected to wear and damage.

For example, such a friction sheet as described above is considered to be used for fix in a fastening matter the reduced rotation output element of a strain wave gearing with a load-side output shaft. When a strain wave gearing called as cup-type or silk-hat-type is employed, a cup-shaped flexible externally toothed gear or silk-hat-shaped flexible externally toothed gear is commonly set to be the reduced rotation output element. A friction sheet is, for example, wedged between the end surface of a discoid boss which defines the cup bottom portion of a flexible externally toothed gear and the end surface of an output shaft, and the output shaft is fixed in a fastening manner with the end surface of the boss with fastening bolts In this case, diamond grains that have fallen off from the friction sheet may infiltrate places such as sliding portions between the flexible externally toothed gear and the wave generator, and meshing portions between the flexible externally toothed gear and the rigid internally toothed gear. When hard diamond grains infiltrate these portions, these portions may be subjected to wear and damage.

In view of the above points, an object of the present invention is to provide a fastening friction plate which prevents foreign matters from producing and which gives no damage to the side of a member to be fastened.

Another object of the present invention is to provide a fastening and fixing structure for a strain wave gearing and an output member.

Means to Solve the Above Problems

To solve the problems described above, according to the present invention, there is provided a fastening friction plate wedged between fastening surfaces of two fastening members to be fixed together in a fastening manner, the fastening friction plate characterized in comprising:

a friction plate main body having a predetermined thickness;

engaging protuberances of a predetermined size formed at a predetermined pitch on both surfaces of the friction plate main body;

the friction plate main body and the engaging protuberances being integrally formed by photo-etching into both surfaces of a steel plate material; and a hardness being at equal to or great than a hardness of the fastening surface of the fastening members.

It is preferable that the engaging protuberances are tapering protuberances protruding perpendicularly from the surface of the friction plate main body, the tips of the engaging protuberances are flat peak surfaces parallel to the surface of the friction plate main body, and the cross-sectional shapes of the engaging protuberances orthogonal to the direction of protrusion are circular, square, or triangular. The engaging protuberances are preferably arranged in a matrix at constant pitches.

When the two fastening components are fastened and fixed together in a manner in which the fastening friction plate is wedged between them, the engaging protuberances formed on the both surfaces of the fastening friction plate dig into the fastening surfaces to produce a large frictional force between the fastening surfaces. The engaging protuberances are integrally photo-etched into the surfaces of the blank of the friction plate made of a steel plate. It is therefore possible to prevent or suppress adverse events such as the engaging protuberances detaching from the friction plate main body and infiltrating the sliding portions and other portions.

Next, a fastening and fixing structure for a strain wave gearing and an output member of the present invention is characterized in that:

a reduced rotation output element of the strain wave gearing and the output member to which the reduced rotation is transferred from the reduced rotation output member are fastened and fixed in a state in which a fastening friction plate is wedged therebetween;

the fastening friction plate has engaging protuberances of a predetermined size formed at a predetermined pitch on both side surfaces of the friction plate main body, the friction plate main body and the engaging protuberances are integrally formed by photo-etching into both surfaces of a steel plate material; and a hardness of the fastening friction plate is at least a hardness of the fastening surfaces of the reduced rotation output element and the output member.

Here, it is preferable that the engaging protuberances are tapering protuberances protruding perpendicularly from the surface of the friction plate main body, the tips of the engaging protuberances are flat peak surfaces parallel to the surface of the friction plate main body, and the cross-sectional shapes of the engaging protuberances orthogonal to the direction of protrusion are circular, square, or triangular.

The reduced rotation output element is generally a flexible externally toothed gear, and the hardness thereof is HRC36 to HRC50 in general. In this case, the hardness of the fastening friction plate is preferably equal to or greater than HRC55.

Further, in this case, it is preferable that:
the plate thickness of the friction plate main body is 0.1 to 0.5 mm;
the pitch of the engaging protuberances is 0.2 to 0.5 mm;
the maximum diameter or maximum width of the peak surfaces of the engaging protuberances is 0.01 to 0.05 mm; and
the height of the engaging protuberances is 1.0 to 1.2 times the maximum diameter or maximum width of the peak surfaces of the protuberances.

In the consideration that the required transfer torque from a standard flexible externally toothed gear to an output member, a fastening force between them, and the hardness of each of the fastening members, the size, shape and pitch of the engaging protuberances are appropriately set, so that it is possible to make the engaging protuberances to dig into the fastening surfaces of the flexible externally toothed gear and the output member by an appropriate dig-in depth. Whereby, a coefficient of friction of the fastening portion between the flexible externally toothed gear and the output member can be made large. Thus, it is possible to realize a fastening structure capable of transferring a large torque.

Further, when the size, shape and pitch of the engaging protuberances are set as described above, it is preferable that the engaging protuberances are arranged in a density of 40 to 250 per 10 mm$^2$.

MODE FOR CARRYING OUT THE INVENTION

The following is a description, made with reference to the drawings, of an embodiment of a fastening and fixing structure for a strain wave gear reducer and a load-side output shaft.

(Strain Wave Gear Reducer)

Figure 1:
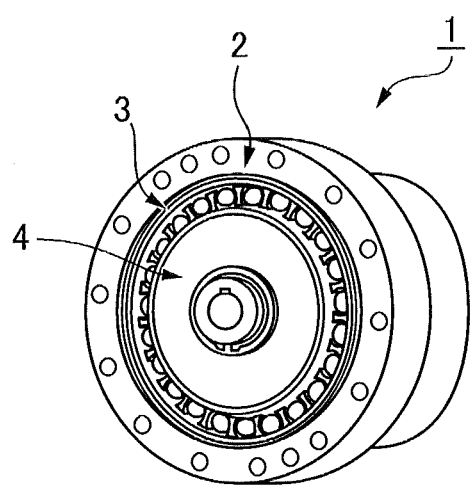
FIG. 1 A perspective view of a cup-shaped strain wave gear reducer to which the present invention is applied.
Figure 2:
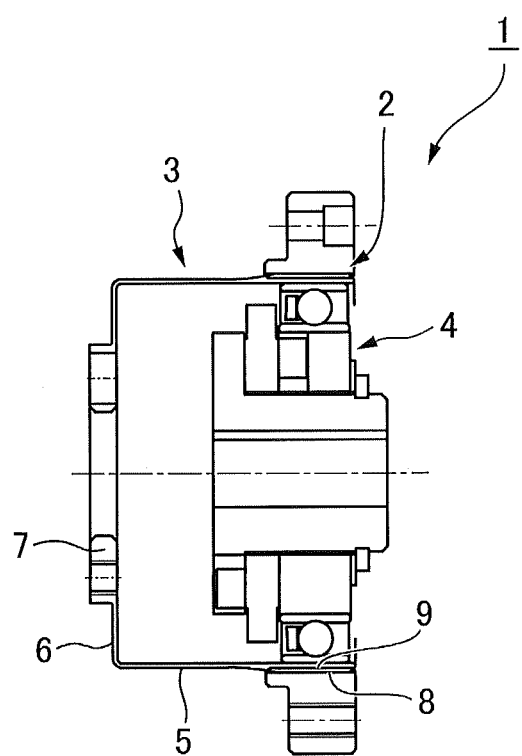
FIG. 2 A longitudinal cross-sectional view of the strain wave gear reducer.

FIG. 1 is a perspective view showing a cup-type strain wave gear reducer, and FIG. 2 is a longitudinal cross-sectional view thereof. The strain wave gear reducer 1 comprises an annular rigid internally toothed gear 2, a cup-shaped flexible externally toothed gear 3 disposed inside the rigid internally toothed gear 2, and an elliptically contoured wave generator 4 fitted inside the flexible externally toothed gear.

The cup-shaped flexible externally toothed gear 3 comprises a cylindrical barrel part 5 capable of flexing in the radial direction, an annular diaphragm 6 extending inward from the rear end edge of the barrel part, an annular boss 7 formed as a continuation of the inner circumferential edge of the diaphragm 6, and external teeth 8 formed in the outer circumferential surface portion in the open end side of the cylindrical barrel part 5. The wave generator 4 is fitted into the inner side of the portion of the cylindrical barrel part 5 where the external teeth 8 are formed in the flexible externally toothed gear 3. The cylindrical barrel part 5 is made to flex into an ellipsoidal configuration, and the portions of the external teeth 8 positioned at both ends of the major axis of the ellipsoidal configuration are meshed with internal teeth 9 of the rigid internally toothed gear 2.

The wave generator 4 is fixedly connected with a rotating input shaft (not shown) such as a motor shaft, and is rotatably driven by this rotating input shaft. When the wave generator 4 rotates, the meshing positions of the gears 2, 3 move in the circumferential direction. As a result, relative rotation occurs between the gears in accordance with the difference in the number of teeth between the two gears. In the present example, the rigid internally toothed gear 2 is fixed to a member on the fixed side (not shown), and the flexible externally toothed gear 3 constitutes a reduced rotation output element, from which the reduced rotation is outputted.

Figure 3:
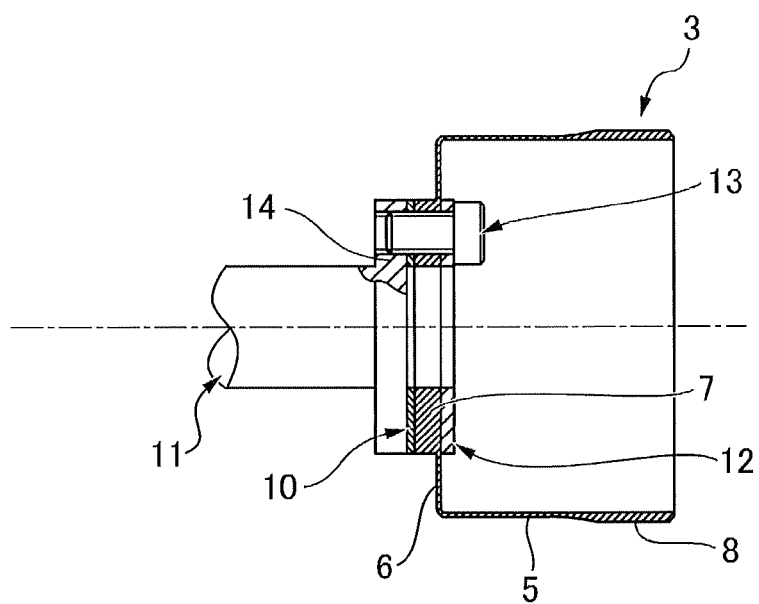
FIG. 3 A longitudinal cross-sectional view showing the fastening and fixing structure for the boss of the flexible externally toothed gear of the strain wave gear reducer and a load-side output shaft.
Figure 4:
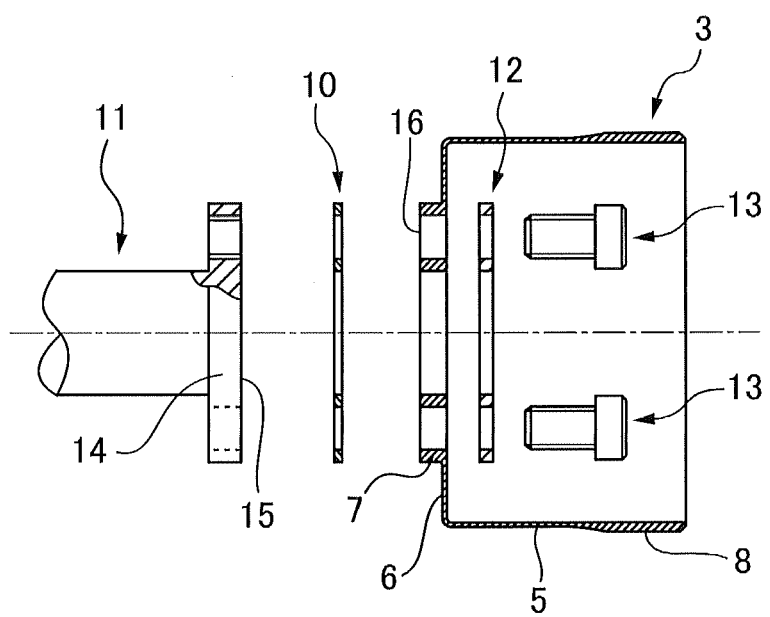
FIG. 4 A longitudinal cross-sectional view showing the structural components of the fastening and fixing structure of FIG. 3 in a dissembled state.

FIG. 3 is a longitudinal cross-sectional view showing the fastening and fixing structure between the flexible externally toothed gear 3 and the load-side output shaft, and FIG. 4 is a schematic diagram showing an exploded view of the structural components thereof. A load-side output member 11 is fastened and fixed to the annular boss 7 of the flexible externally toothed gear 3 in a manner in which a disc-shaped fastening friction plate 10 is wedged between them. A plurality of fastening bolts 13 are used for this fastening and fixing.

A shaft-side flange 14 having a large diameter is formed in the rear end of the output shaft 11, and the circular rear end surface of the shaft-side flange 14 is a shaft-side fastening surface 15. The shaft-side fastening surface 15 is superposed coaxially with a boss-side fastening surface 16, which is the outer side end surface of the boss 7, in a manner in which the fastening friction plate 10 is wedged between them. An attachment flange 12 is superposed coaxially with the inner side end surface of the boss 7. Bolt holes are formed at fixed intervals in the circumferential direction in the shaft-side flange 14, and bolt insertion holes are similarly formed at fixed intervals in the circumferential direction in the boss 7 and the attachment flange 12. The four members are coaxially superposed so that these bolt holes and bolt insertion holes coincide, and the four members are fixed in a fastened manner with a predetermined bolt tension by the fastening bolts 13 inserted from the side of the attachment flange 12.

Figure 5:
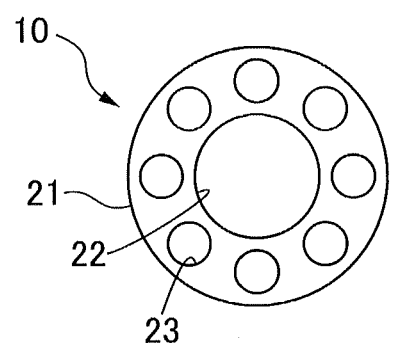
FIG. 5 A plan view showing the fastening friction plate.
Figure 6:
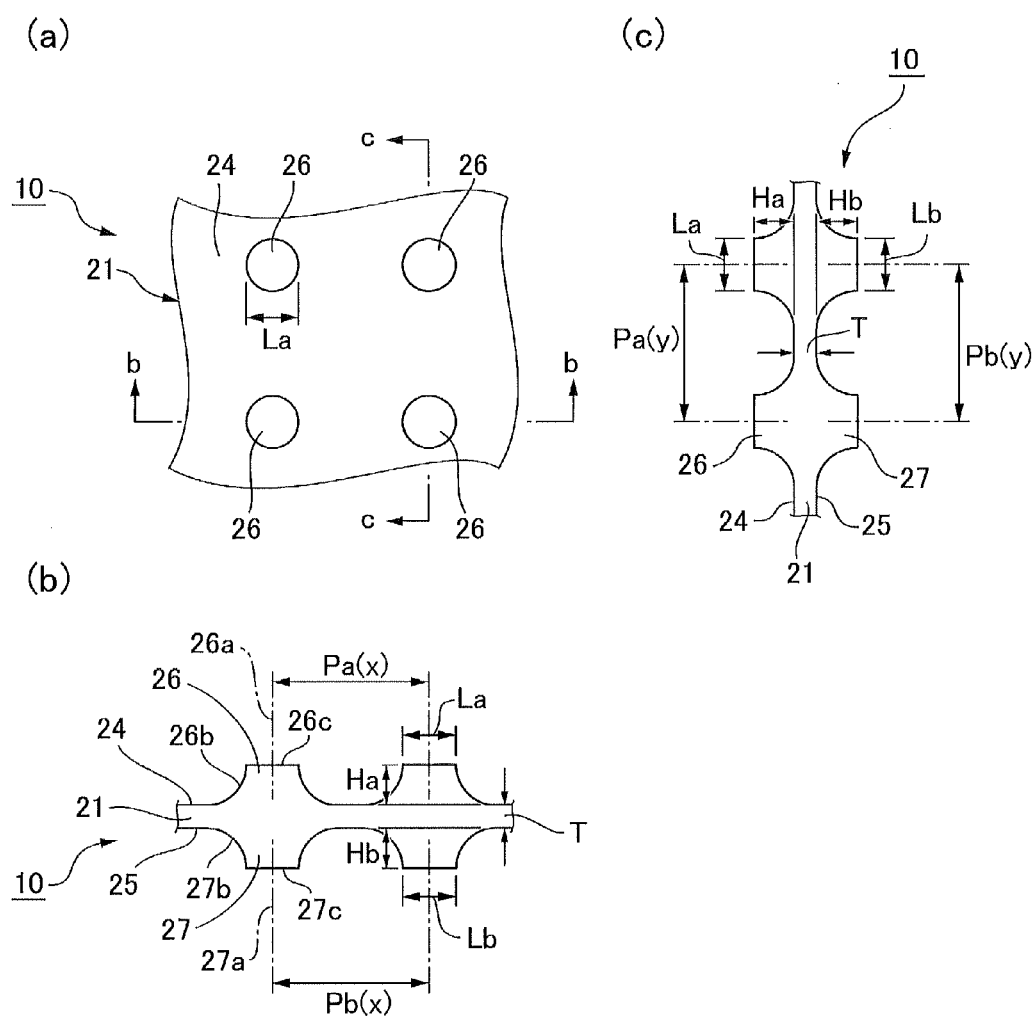
FIG. 6 (a) is a partial enlarged plan view showing the fastening friction plate, (b) is a partial enlarged cross-sectional view, and (c) is a partial enlarged cross-sectional view.

FIG. 5 is a plan view showing the fastening friction plate 10, and FIG. 6(a) to (c) are, respectively, a partial enlarged plan view showing an enlarged view of the surface of the boss-side fastening surface 16, a partial enlarged cross-sectional view sectioned along line b-b, and a partial enlarged cross-sectional view sectioned along line c-c.

The fastening friction plate 10 is constituted so that it comprises a friction plate main body 21 having a constant plate thickness and a shape corresponding to that of the boss-side fastening surface 16 (see FIG. 4), a circular center through hole 22, and a plurality of bolt insertion holes 23 arranged at a constant interval along the circumferential direction, the hole 22 and the insertion holes 23 being formed in the friction plate main body.

One of the surfaces of the friction plate main body 21 is a boss-side surface 24 which is superposed on the boss-side fastening surface 16, and the other surface thereof is a shaft-side surface 25 which is superposed on the shaft-side fastening surface 15. These boss-side and shaft-side surfaces 24, 25 are integrally formed with engaging protuberances 26, 27 of a predetermined shape at a fixed pitch by photo etching.

The friction plate main body 21 of the present embodiment has a plate thickness of 0.1 to 0.5 mm. The engaging protuberances 26, 27 are arrayed in a matrix at fixed pitches, and the pitches Pa(x), Pa(y), Pb (x) and Pb(y) of adjacent engaging protuberances each fall within a range of 0.2 to 0.5 mm. The arrayed pattern of the engaging protuberances 26, 27 may be an arrayed pattern other than a matrix arrayed pattern. The arrayed patterns of protuberances for the boss-side and shaft-side surfaces 24 and 25 can be those different with each other.

The engaging protuberances 26, 27 are protuberances having an overall shape resembling a circular truncated cone, and the center axis lines 26a, 27a thereof are perpendicular to the friction plate main body 21. The outer circumferential surfaces 26b, 27b of the respective engaging protuberances 26, 27 are formed from curved surfaces that taper towards the tip. The peak surfaces 26c, 27c of the engaging protuberances are flat circular surfaces orthogonal to the center axis lines 26a, 27a.

The maximum diameters La, Lb of the peak surfaces 26c, 27c in the engaging protuberances 26, 27 are 0.01 to 0.05 mm. The heights Ha, Hb of the engaging protuberances 26, 27 (which are heights from the boss-side surface 24 of the friction plate main body 21 and from the shaft-side surface 25) are equal to or less than 0.06 mm, and at the same time, 1.0 to 1.2 times the maximum diameter L of the peak surfaces 26c, 27c. The heights Ha and Hb can be either same to or different form each other. The engaging protuberances 26, 27 are also formed with a density of 40 to 250 per 10 $mm^2$.

In the example depicted, the plate thickness T of the friction plate main body 21 is 0.1 mm, the diameters La, Lb of the peak surfaces 26c, 27c of the engaging protuberances 26, 27 are 0.05 mm, the heights Ha, Hb are 0.065 mm, and the pitches Pa(x), Pa(y), Pb(x), Pb(y) are 0.2 mm.

The hardness of the friction plate main body 21 and the engaging protuberances 26, 27 is HRC 55 or greater. A material having a hardness of HRC55 or greater may be used as a blank of the fastening friction plate. Otherwise, when the hardness of the blank is less than HRC55, a surface treatment such as a heat treatment, a carburizing treatment, or a nitriding treatment may be performed during either the stage before or the stage after photo-etching the engaging protuberances 26, 27 to bring the hardness of the both-side surfaces of the friction plat main body 21 and the engaging protuberances 26, 27 to HRC55 or greater. The hardness of the flexible externally toothed gear 3 is commonly between HRC36 to 50, and the material hardness of the output member 11 is the same. Since the hardness of the fastening friction plate 10 is set greater than those of the flexible externally toothed gear and the output shaft, it is possible to make the engaging protuberances 26, 27 to dig into the boss-side fastening surface 16 and the shaft-side fastening surface 15 by the fastening force (axial force) of the fastening bolts 13.

Figure 7:
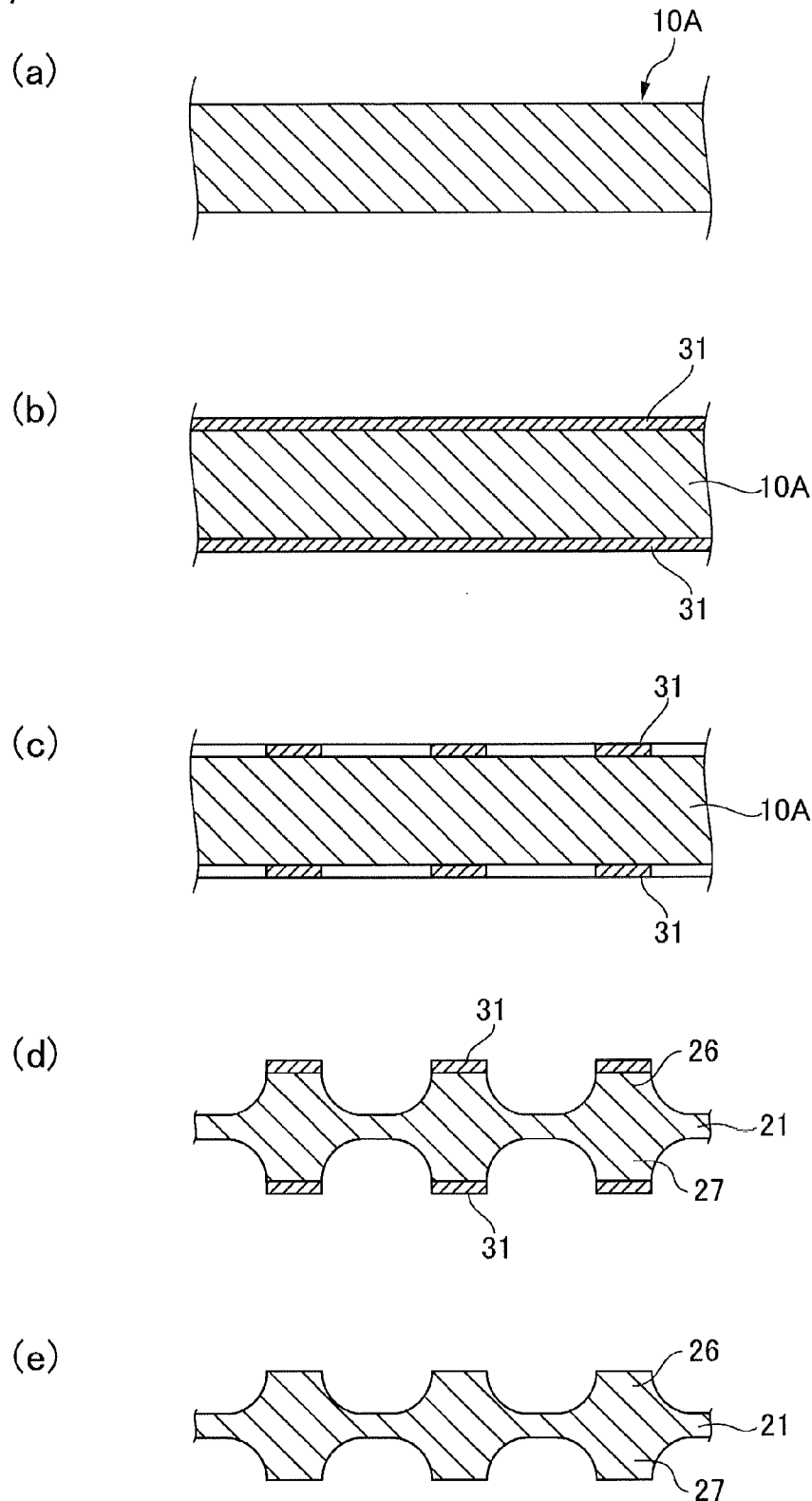
FIG. 7 A schematic diagram showing the steps of manufacturing the engaging protuberances by photo etching.

The engaging protuberances 26, 27 herein can be formed by common photo-etching. For example, as shown in FIG. 7, a blank 10A made of steel plate is prepared (FIG. 7(a)) and a photo resist film 31 is formed on the both surfaces of the blank (FIG. 7(b)). The photo resist film 31 is then subjected to light exposure and image development to form a masking pattern on the photo resist film (FIG. 7(c)). Wet etching, for example, is then performed on the exposed surface portions of the blank 10A to form the engaging protuberances 26, 27 (FIG. 7(d)). The masking pattern of the photo resist film 31 is then peeled off, and post treatments such as washing and drying steps are performed (FIG. 7(e)). Substantially circular truncated cone-shaped engaging protuberances 26, 27 in the case that the masking pattern is circular, are thereby formed integrally in the both surfaces of the friction plate main body 21. In the case that the masking pattern is square or triangular, square truncated cone-shaped or triangular truncated cone-shaped engaging protuberances 26, 27 are formed. Usually, the engaging protuberances are formed on one surface of the blank 10A and then are formed on the other surface thereof.

Figure 8:
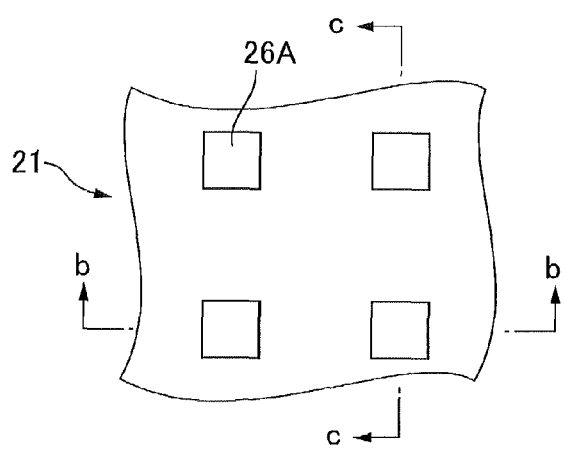
FIG. 8 (a) is a partial enlarged plan view showing another example of the engaging protuberances of the fastening friction plate, (b) is a partial enlarged cross-sectional view, and (c) is a partial enlarged cross-sectional view.
Figure 8:
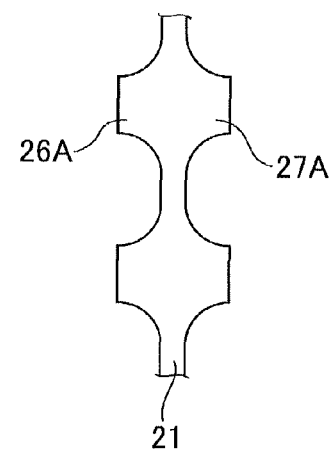
Figure 8:
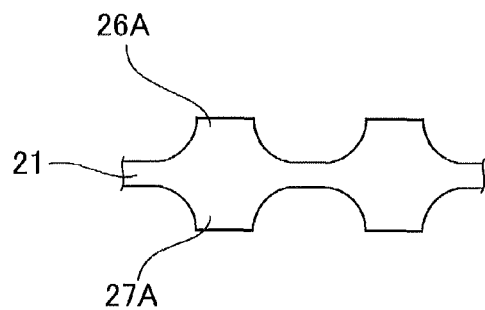
Figure 9:
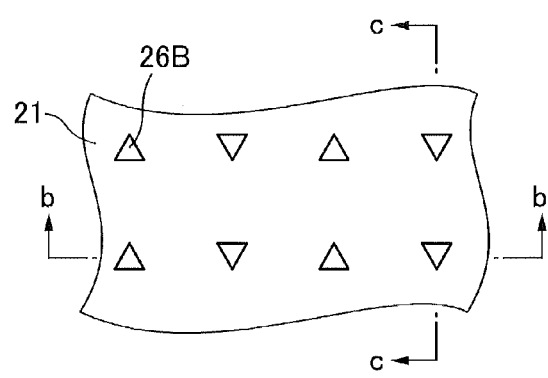
FIG. 9 (a) is a partial enlarged plan view showing another example of the engaging protuberances of the fastening friction plate, (b) is a partial enlarged cross-sectional view, and (c) is a partial enlarged cross-sectional view.
Figure 9:
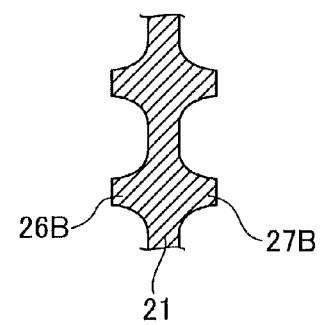
Figure 9:
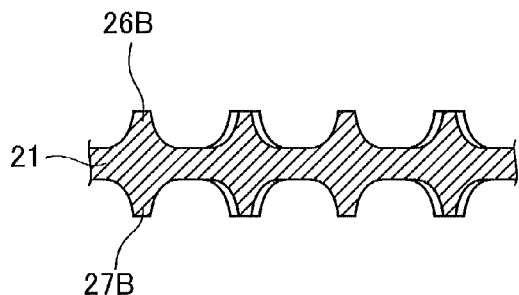

FIGS. 8 and 9 show other shapes of the engaging protuberances 26, 27. The engaging protuberances 26A, 27A shown in FIG. 8 overall have a substantially square truncated cone shape. For example, the peak surfaces of the engaging protuberances 26A, 27A are regular tetrahedrons, the width is 0.05 mm, the height is 0.06 mm, and the pitch is 0.2 mm. The engaging protuberances 26B, 27B shown in FIG. 9 overall have a substantially triangular truncated cone shape. For example, the peak surfaces of the engaging protuberances 26B, 27b are equilateral triangles, and the width of these equilateral triangles is 0.06 mm. The height of the engaging protuberances 26B, 27B is 0.06 mm and the pitch is 0.2 mm. In every row of the engaging protuberances 26B, 27B arrayed in a matrix, every other triangle is reversed in orientation.

In the fastening and fixing structure between the flexible externally toothed gear 3 and the load-side output shaft 11, the fastening force when the engaging protuberances 26, 27 of the fastening friction plate 10 dig into (press into) the boss-side fastening surface 16 and the shaft-side fastening surface 15 can be approximated as the wear associated with digging out steel. To give a description referencing FIG. 10(a), a case is envisioned in which conic protuberances press into the fastening surface. In this case, n conic protuberances are in contact with the fastening surface. The projected surface area (triangular) At of the conic protuberances in the advancing direction shown by the bold arrow is expressed by the following formula.

$$At = n \cdot r \cdot d = n \cdot r \cdot r \cdot \cot\theta = n \cdot r2 \cdot (1/\tan\theta)$$

r: the average radius of the indentations made by the conic protuberances
θ: half the apex angle of the conic protuberances
d: depth The surface area of the indentations made by the conic protuberances can be approximated as shown by the following formula.

$$\text{Surface area of indentations made by conic protuberances} \approx \text{Real contact area } Ar = P/Pm = n \cdot \pi r^2$$

P: total load
Pm: average surface pressure of real contact area

Therefore, with F being a dig-out resistance force (frictional force), the coefficient of friction μ can be expressed by the following formula.

$$\text{Coefficient of friction } \mu = F/P = At \cdot Pm/Ar \cdot Pm = At/Ar = 1/(\pi \cdot \tan\theta)$$

When θ of the conic protuberances is 45 degrees, μ=0.3183.

Figure 10:
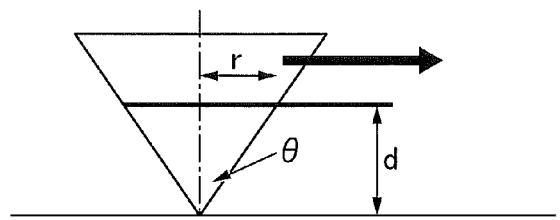
FIG. 10 (a) is a schematic diagram showing a conic protuberance in a state of pressing into the surface of a steel material, and (b) is a schematic diagram showing an engaging protuberance in a state of digging into the boss.
Figure 10:
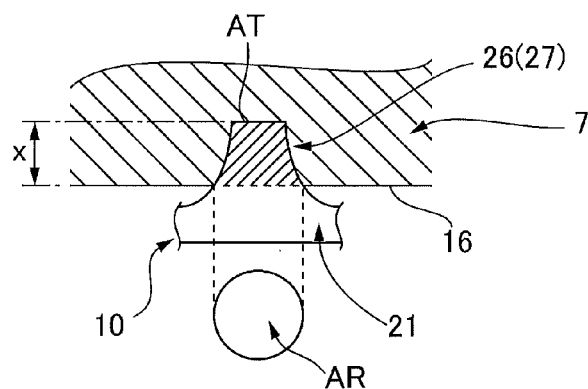

FIG. 10(b) shows a case in which the circular truncated cone-shaped engaging protuberances 26, 27 of the present example are made to dig into the boss-side fastening surface 16 and the shaft-side fastening surface 15. In this case, the values can be approximated as follows.

Dig-in depth x≈d
Dig-in projected surface area AT≈At
Indentation surface area AR≈Ar
Approximate coefficient of friction M=AT/AR The transmitted torque of the fastening and fixing structure using the fastening friction plate 20 is greatly affected by both coefficients of friction of the boss-side fastening surface 16 and the shaft-side fastening surface 15 when the engaging protuberances 26, 27 are made to dig into (press into) these fastening surfaces. These coefficients of friction can be defined by the dig-in projected surface area AT and the indentation surface area AR as stated above. Specifically, the coefficients of friction are determined by the respective shapes, sizes, and dig-in depths of the engaging protuberances 26, 27, and by the differences in hardness between the fastening friction plate 20 and boss-side fastening surface 16 and between the fastening friction plate 20 and the shaft-side fastening surface 15.

Therefore, fastening surfaces having the desired coefficient of friction can be obtained by appropriately setting the shapes and sizes of the engaging protuberances 26, 27, the hardness of the fastening friction plate 20. In the present example, the circular truncated cone-shaped engaging protuberances 26, 27 are formed by photo etching (chemical etching). Large coefficients of friction can be achieved by giving the engaging protuberances 26, 27 so shaped the size D of the peak surfaces, the protuberance height H, and the hardness described above.

The number of protuberances n is limited by the shear strength of the material as derived from the total indentation surface area (AR×n). In the present example, the number of protuberances n is 40 to 250 per 10 mm², taking into account the shear strength of the fastening friction plate 20.

Furthermore, when the same bolt tension is applied, the dig-in depth x of the engaging protuberances differs depending on the shape of the peak surfaces of the protuberances. When the shape of the peak surfaces of the engaging protuberances is circular, square, and triangular, assuming all other conditions are equal, the triangular surfaces dig in the most easily, and the circular surfaces dig in with the most difficulty. Fastening surfaces of lower hardness have a greater dig-in depth x than fastening surfaces of higher hardness. Furthermore, the dig-in depth x of the engaging protuberances differs depending on the surface area of the peak surfaces of the engaging protuberances, and surfaces of less surface area dig in more easily. Similarly, peak surfaces of the engaging protuberances having less total surface area dig in more easily than peak surfaces having greater total surface area. Therefore, the size and shape (the shape of the peak surfaces, the surface area, and the protuberance height) of the engaging protuberances 26, 27, the pitch and number of engaging protuberances 26, 27 per unit surface area, and the hardness of all components are preferably set as appropriate according to the size of the flexible externally toothed gear to be fastened, the necessary transmitted torque, and the added tension.

The invention claimed is:

1. A fastening and fixing structure for a strain wave gearing, comprising:
   a reduced rotation output element of a strain wave gearing;
   a fastening friction plate;
   an output member, wherein the reduced rotation output element and the output member are fastened and fixed in a state in which the fastening friction plate is wedged therebetween, wherein the reduced rotation output element is a flexible externally toothed gear and a reduced rotation is transmitted from the flexible externally toothed gear to the output member;
   the fastening friction plate has a friction plate main body of a predetermined thickness, and engaging protuberances of a predetermined size formed at a predetermined pitch on both surfaces of the friction plate main body;
   the friction plate main body and the engaging protuberances are integrally formed by photo-etching into both surfaces of a steel plate material;
   the engaging protuberances are tapering protuberances protruding perpendicularly from the surfaces of the friction plate main body;
   tips of the engaging protuberances are flat peak surfaces parallel to the surfaces of the friction plate main body, and side surfaces of the engaging protuberances are concave curved surfaces;
   a cross-sectional shape of the engaging protuberances orthogonal to a direction of protrusion is circular, square, or triangular;
   a hardness of the flexible externally toothed gear is HRC36 to HRC50;
   a hardness of the fastening friction plate is equal to or greater than HRC55;
   a thickness of the friction plate main body is 0.1 to 0.5 mm, a an arranging pitch of the engaging protuberances is 0.2 to 0.5 mm,
   a maximum diameter or maximum width of peak surfaces of the engaging protuberances is 0.01 to 0.05 mm, and
   a height of the engaging protuberances is 1.0 to 1.2 times the maximum diameter or maximum width of the peak surfaces of the protuberances.

2. The fastening and fixing structure for a strain wave gearing and an output member according to claim 1, wherein the engaging protuberances are arranged in a density of 40 to 250 per 10 mm².

* * * * *